(12) United States Patent
Yeh et al.

(10) Patent No.: US 8,866,749 B2
(45) Date of Patent: Oct. 21, 2014

(54) BACKLIGHT MODULE AND RELATED MANUFACTURING METHOD AND OPERATION INTERFACE

(75) Inventors: Chih-Feng Yeh, Taipei Hsien (TW); Cheng-Ju Lee, Taipei Hsien (TW); Chia-Hung Chan, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 843 days.

(21) Appl. No.: 12/435,389

(22) Filed: May 4, 2009

(65) Prior Publication Data

US 2010/0164874 A1 Jul. 1, 2010

(30) Foreign Application Priority Data

Dec. 31, 2008 (TW) ................................ 97151619 A

(51) Int. Cl.
| | | |
|---|---|---|
| G06F 3/02 | (2006.01) | |
| H01H 13/83 | (2006.01) | |
| H01J 9/227 | (2006.01) | |
| G06F 1/16 | (2006.01) | |
| F21V 8/00 | (2006.01) | |

(52) U.S. Cl.
CPC ........ G06F 1/1613 (2013.01); H01H 2219/052 (2013.01); H01H 13/83 (2013.01); H01J 9/227 (2013.01); G06F 1/1662 (2013.01); H01H 2219/044 (2013.01); G02B 6/0035 (2013.01); H01H 2219/062 (2013.01); G02B 6/0065 (2013.01)
USPC ....................................................... 345/170

(58) Field of Classification Search
CPC ........ H01L 33/00; H05B 33/14; C09K 11/66; C09K 11/79
USPC ............... 345/168–170; 362/24, 26, 602, 619
See application file for complete search history.

(56) References Cited

U.S. PATENT DOCUMENTS

| | | | | |
|---|---|---|---|---|
| 5,676,891 | A | * | 10/1997 | Boedinger .................... 264/1.22 |
| 6,927,894 | B2 | * | 8/2005 | Blum et al. .................... 359/319 |
| 7,095,400 | B2 | * | 8/2006 | Ho et al. ........................ 345/102 |
| 2001/0013854 | A1 | * | 8/2001 | Ogoro ........................... 345/102 |
| 2009/0057698 | A1 | * | 3/2009 | Okamura et al. ............... 257/98 |
| 2009/0134775 | A1 | * | 5/2009 | Watanabe et al. ............. 313/503 |

FOREIGN PATENT DOCUMENTS

| | | |
|---|---|---|
| CN | 1885461 A | 12/2006 |
| CN | 101145456 A | 3/2008 |
| TW | M343865 | 11/2008 |
| WO | WO 2006087660 A1 * | 8/2006 |

OTHER PUBLICATIONS

Office action mailed on Apr. 20, 2011 for the China application No. 200910000598.3, p. 3 line 4-25.
Office action mailed on Aug. 11, 2011 for the Taiwan application No. 097151619, p. 1 line 12-14 and p. 2 line 1-7.

* cited by examiner

*Primary Examiner* — Tony N Ngo
(74) *Attorney, Agent, or Firm* — Winston Hsu; Scott Margo

(57) ABSTRACT

A backlight module for an operation interface of a portable electronic device is disclosed. The operation interface includes at least one keypad. The backlight module includes a light guide film including at least one hole corresponding to the at least one keypad, a backlight board installed in the bottom of the light guide film for reflecting light, and a light emitting unit installed in a side of the light guide film for generating light source to inside of the light guide film, wherein the at least one hole of the light guide film is filled with a phosphor material.

15 Claims, 8 Drawing Sheets

BACKLIGHT MODULE AND RELATED MANUFACTURING METHOD AND OPERATION INTERFACE

BACKGROUND OF THE INVENTION

1. Field of the Invention

The present invention is related to a backlight module and related manufacturing method and operation interface, and more particularly, to a backlight module and related manufacturing method and operation interface capable of emitting lights for a period of time when power supply is shut down.

2. Description of the Prior Art

With technology advancement, portable electronic devices, such as cellular phones, personal digital assistants, MP3 players, hand-held videogame devices, etc., are widely used in daily life. In order to allow a operation to keep handy, a portable electronic device is equipped with a rechargeable battery, to store operating power. Due to limited electricity stored by the rechargeable battery, how to decrease power consumption of the portable electronic device during operation becomes a goal in the industry.

In the portable electronic device, except an operating circuit and an output interface (e.g. monitor, speakers, etc.), an operation interface (e.g. keypads or keyboard) is one of power consuming elements. In general, for convenience or fascinating appearance, the operation interface of the portable electronic device comprises a backlight source to show corresponding characters clearly. To reach such effect, the prior art utilizes a light guide film to uniformly emit light generated by a light emitting unit. Please refer to FIG. 1. FIG. 1 is a cross-sectional view diagram of a backlight module for a keypad or keyboard in the prior art. In FIG. 1, according to a principle of light reflection, a light guide film 100 uniformly transmits light (represented by dotted lines in FIG. 1) generated by a light emitting unit 102 (e.g. light-emitting diode) to all areas of the keyboard. An oblique area A is corresponding to a keypad. Therefore, in order to obviously show a character corresponding to the keypad, the prior art drills a hole or prints special paint on the oblique area A, to emit light transmitted inside the light guide film 100 from the oblique area A.

Since the light guide film 100 can uniformly transmit light generated by the light emitting unit 102 to all the areas, the portable electronic device only requires a few light emitting units, to provide backlight to all keypads or the keyboard. Meanwhile, via the principle of light reflection, a forming position of the light emitting unit 102 is not limited, which benefits mechanism arrangement. However, the light guide film 100 can only transmit light; that is, once the light emitting unit 102 works, the oblique area A luminesces. Under such circumstances, when the user uses the portable electronic device, the light emitting unit 102 has to function continuously to show characters on keypads. Hence, power consumption is increased.

Therefore, how to form a backlight module which can store light energy to decrease power consumption of the operation interface in the portable electronic device becomes a goal in the industry.

SUMMARY OF THE INVENTION

It is therefore a primary objective of the claimed invention to provide a backlight module and related manufacturing method and operation interface.

The present invention discloses a backlight module for an operation interface of a portable electronic device. The operation interface comprises at least one keypad and the backlight module comprises a light guide film comprising at least one hole corresponding to the at least one keypad, a backlight board installed at a bottom of the light guide film for reflecting light, and a light emitting unit installed on a side of the light guide film for generating a light source to an inside of the light guide film; wherein the at least one hole of the light guide film is filled with a phosphor material.

The present invention discloses a method of manufacturing a backlight module, which comprises forming a light guide film, forming at least one hole at a position corresponding to at least one keypad of an operation interface in the light guide film, filling the at least one hole with a phosphor material, forming a backlight board at a bottom of the light guide film, and forming a light emitting unit on a side of the light guide film.

The present invention discloses an operation interface for a portable electronic device, which comprises at least one keypad, a backlight module, a power supply device, and a control circuit. The backlight module comprises a light guide film comprising at least one hole corresponding to the at least one keypad and filled with a phosphor material, a backlight board installed at a bottom of the light guide film for reflecting light, and a light emitting unit installed on a side of the light guide film for generating a light source to an inside of the light guide film. The power supply device is utilized for providing a power source to the light emitting unit. The control circuit is utilized for controlling the power supply device according to a pressing condition of the at least one keypad.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
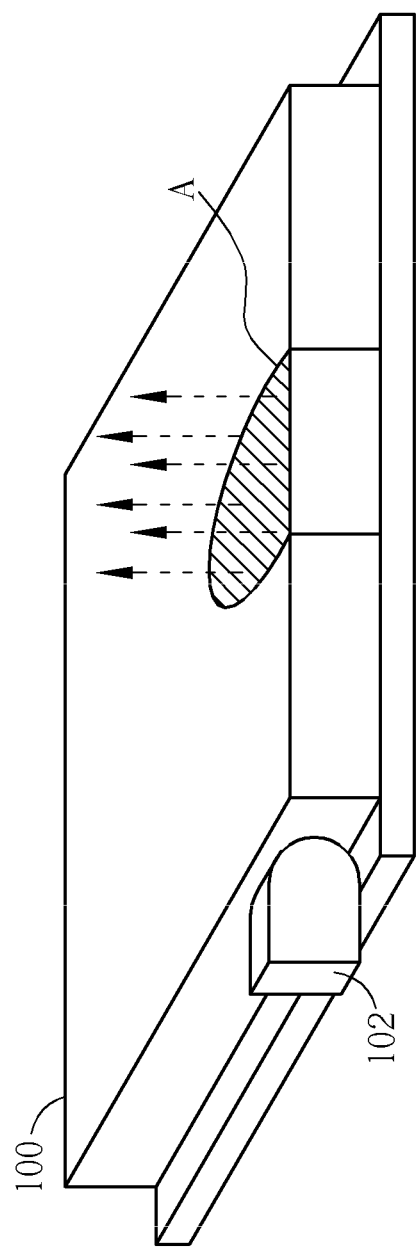
FIG. 1 is a cross-sectional view diagram of a light guide film of the prior art.
Figure 2A:
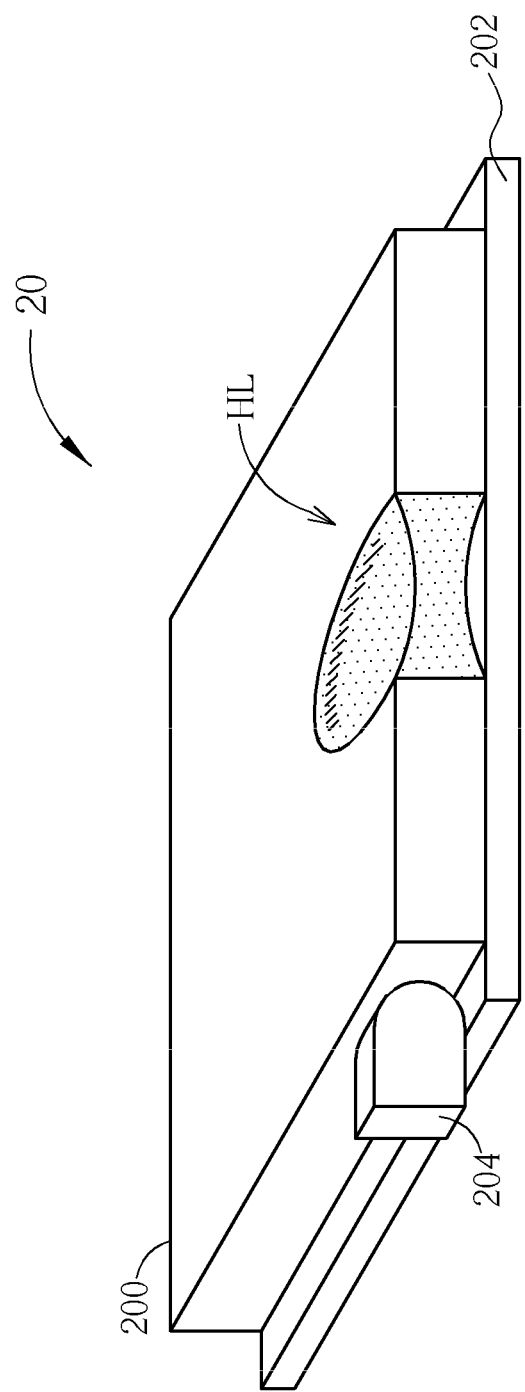
FIG. 2A is a cross-sectional view diagram of a backlight module according to an embodiment of the present invention.

Please refer to FIG. 2A, which is a cross-sectional view diagram of a backlight module 20 according to an embodiment of the present invention. The backlight module 20 is utilized for an operation interface of a portable electronic device, and comprises a light guide film 200, a backlight board 202, and a light emitting unit 204. The light guide film 200 comprises a hole HL, which is corresponding to a keypad of the operation interface, and filled with a phosphor material. The backlight board 202 is installed at a bottom of the light guide film 202 for reflecting light. The light emitting unit 204 can be a light-emitting diode or other light emitting devices, and is installed on a side of the light guide film 200, for generating a light source to an inside of the light guide film 200.

Simply speaking, when the light emitting unit 204 works, the light guide film 200 transmits the light source generated by the light emitting unit 204, to make the hole HL bright, and further to clearly display a corresponding character. When the light emitting unit 204 is shut down, since the phosphor material in the hole HL can temporarily preserve light energy, the hole HL can still keep bright. Under such circumstances, the present invention can save power by switching the light emitting unit 204 on/off, and related manipulation is described later.

Figure 2B:
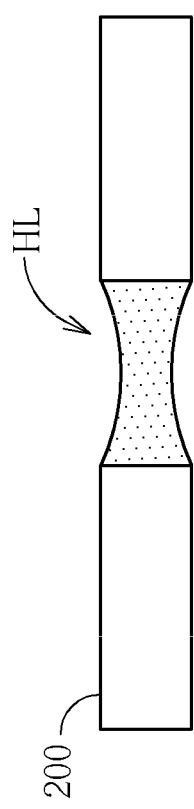
FIG. 2B is a lateral view diagram of a light guide film shown in FIG. 2A.

Besides, please refer to FIG. 2B, which is a lateral view diagram of the light guide film 200 in FIG. 2A. As shown in FIG. 2A and FIG. 2B, the phosphor material filled in the hole HL forms a double concave structure. Since the double concave structure has a focusing effect, light emitted from the hole HL can be focused, to further enhance the luminous efficiency.

Figure 3:
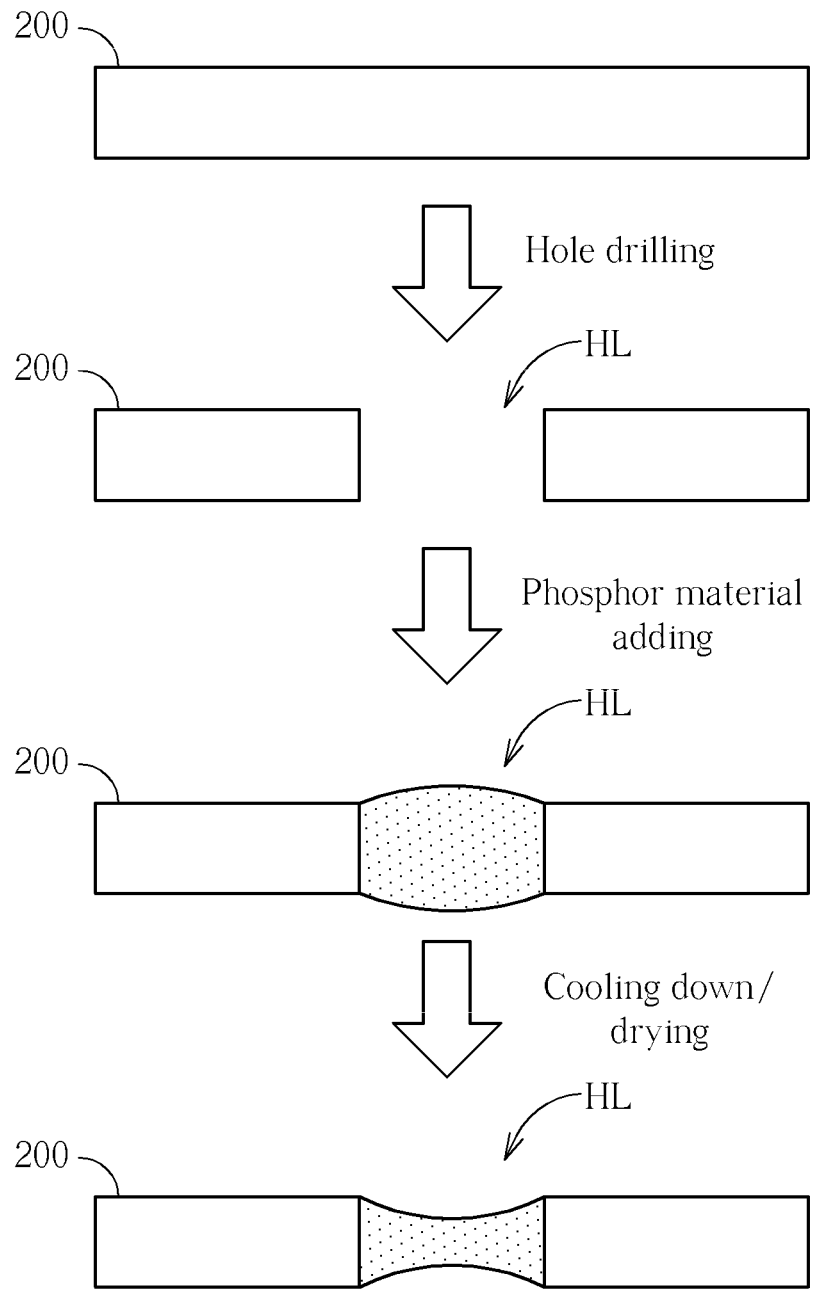
FIG. 3 is a schematic diagram of a hole shown in FIG. 2A filled with a liquid phosphor material according to an embodiment of the present invention.

Note that, the idea of the present invention is to fill the hole HL with the phosphor material, so that the backlight module 20 can keep bright for a while right after the light emitting unit 204 is off. Hence, whether the phosphor material filled in the hole HL is the double concave structure can still apply to the present invention. Similarly, the phosphor material is not limited in any specification or characteristic, as long as the phosphor material can temporarily preserve and release light energy. Certainly, those skilled in the art should properly adjust a manufacturing method of the backlight module 20 according to the applied phosphor material. For example, please refer to FIG. 3, which is a schematic diagram of the hole HL filled with a liquid phosphor material. As shown in FIG. 3, after forming the light guide film 200, the present invention drills a hole at a proper position to form the hole HL. Next, the hole HL is filled with the liquid phosphor material, and the volume of the liquid phosphor material is slightly more than the volume of the hole via surface tension. Thus, after cooled down or dried, the liquid phosphor material forms the double concave structure.

FIG. 3 illustrates an example of manufacturing the light guide film 200 when the hole HL is filled with the liquid phosphor material. If the phosphor material filled in the hole HL is powdered, the present invention can form the double concave structure by hot pressing. The abovementioned methods illustrate the possible manufacturing processes of the backlight module 20, and those skilled in the art can make modifications and alterations of the present invention.

Figure 4:
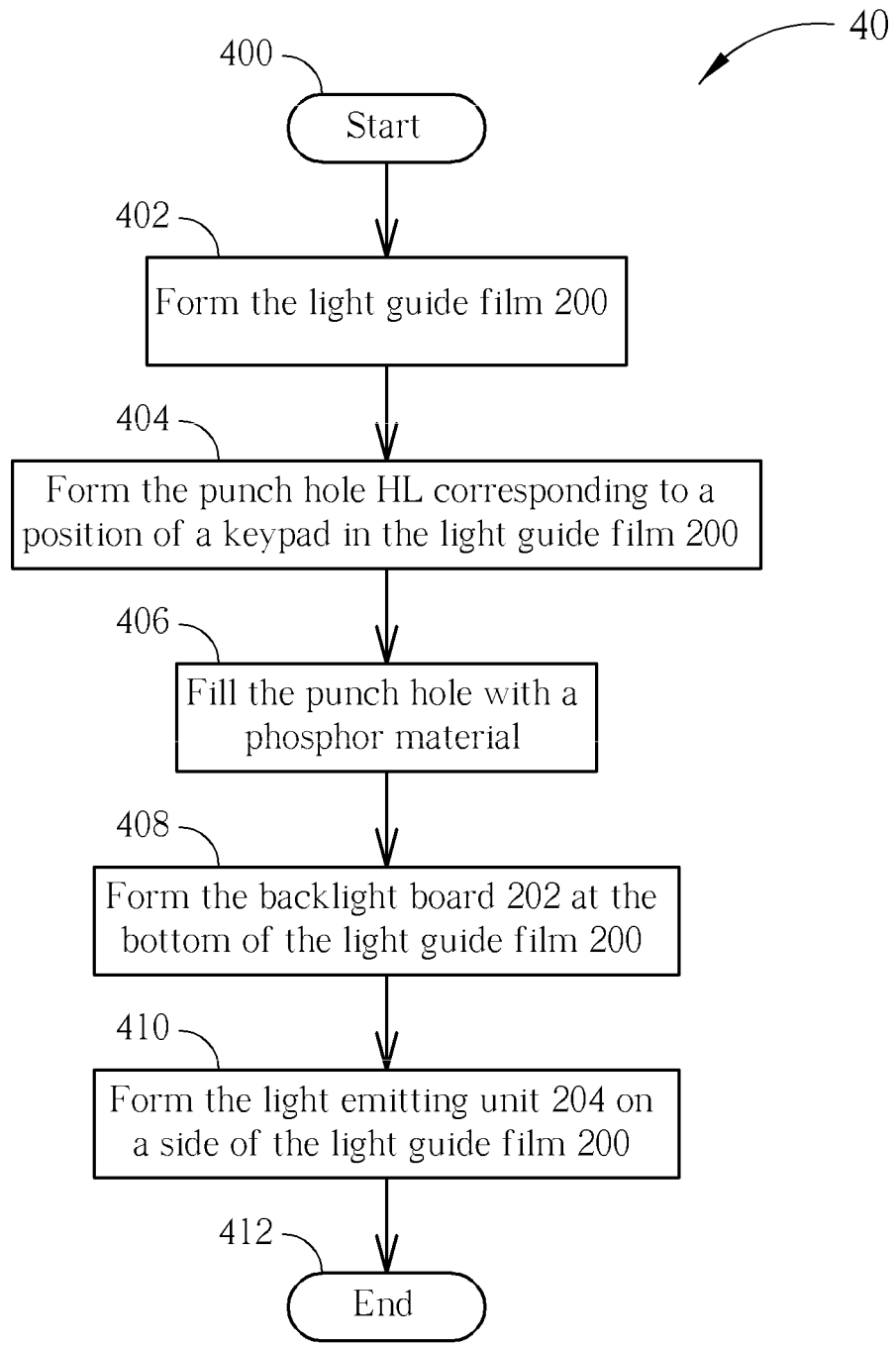
FIG. 4 is a schematic diagram of a manufacturing process of the backlight module shown in FIG. 2A.

Furthermore, regarding to the manufacturing process of the backlight module 20, a manufacturing process 40 is concluded as shown in FIG. 4. The manufacturing process 40 comprises the following steps:

Step 400: Start.
Step 402: Form the light guide film 200.
Step 404: Form the hole HL corresponding to a position of a keypad in the light guide film 200.
Step 406: Fill the hole with a phosphor material.
Step 408: Form the backlight board 202 at the bottom of the light guide film 200.
Step 410: Form the light emitting unit 204 on a side of the light guide film 200.
Step 412: End.

The manufacturing process 40 illustrates the manufacturing method of the backlight module 20, which goes with FIG. 2A and not narrated again herein.

Figure 5:
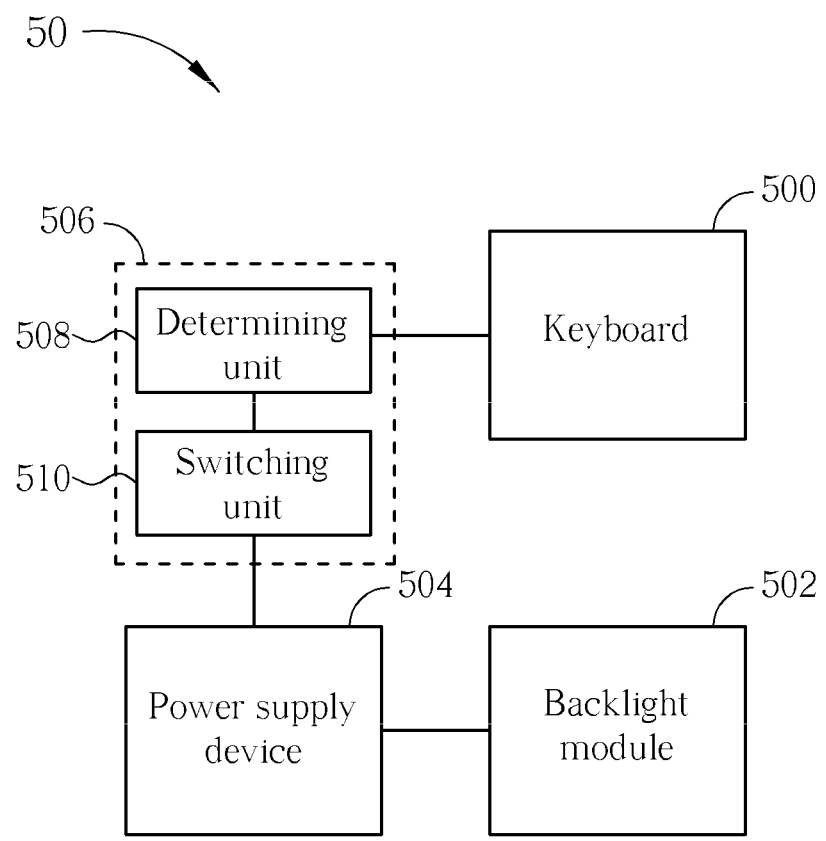
FIG. 5 is a schematic diagram of an operation interface of a portable electronic device according to an embodiment of the present invention.

Using the phosphor material, the backlight module 20 can keep bright for a while right after the light emitting unit 204 is turned off, so as to save power via switching the light emitting unit 204 on/off. For example, please refer to FIG. 5, which is a schematic diagram of an operation interface 50 for a portable electronic device according to an embodiment of the present invention. The operation interface 50 comprises a keyboard 500, a backlight module 502, a power supply device 504, and a control circuit 506. The keyboard 500 is composed of at least one keypad, and is utilized for receiving a control signal from an operation. The power supply device 504 is utilized for providing power for the backlight module 502, such that the keyboard 500 can display characters and functions corresponding to the keypads. The backlight module 502 is utilized for providing a backlight source for the keypads of the keyboard 500, and is designed according to the backlight module 20 shown in FIG. 2A. That is, the backlight module 502 can keep bright for a while via a phosphor material right after the power supply device 504 is turned off. The control circuit 506 can control an operation of the power supply device 504 according to a pressing condition of any keypad in the keyboard 500. The control circuit 506 comprises a determining unit 508 and a switching unit 510. The determining unit 508 is utilized for determining the pressing condition of any keypad in the keyboard 500, to generate a determination result. According to the determination result, when a keypad is pressed, the switching unit 510 controls the power supply device 504 to intermittently output power to a light emitting unit of the backlight module 502.

In short, since the phosphor material can preserve light energy temporarily, the backlight module 502 can keep bright for a while right after the power supply device 504 is turned off. Hence, the control circuit 506 controls the power supply device 504 to intermittently output power, so as to reduce power-on duration and further save power consumption.

Figure 6A:
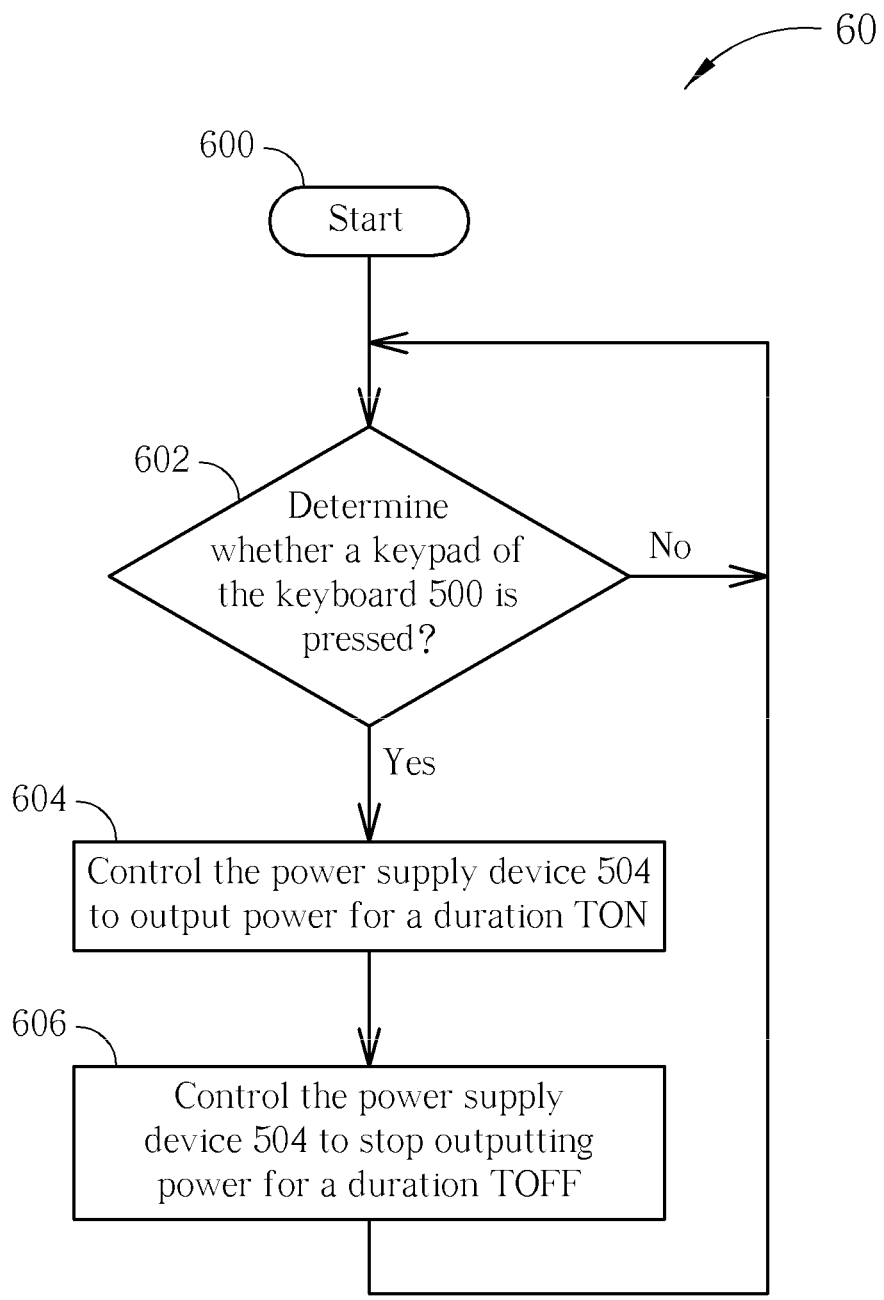
FIG. 6A is a schematic diagram of a control process of a control circuit applied in FIG. 5.

Regarding to the operation of the control circuit 506, please refer to FIG. 6A, which is a schematic diagram of a control process 60 for the control circuit 506. The control process 60 comprises the following steps:

Step 600: Start.
Step 602: Determine whether a keypad of the keyboard 500 is pressed. If yes, go to step 604; else, repeat determining action.
Step 604: Control the power supply device 504 to output power for a duration TON.
Step 606: Control the power supply device 504 to stop outputting power for a duration TOFF, and go back to step 602.

Figure 6B:
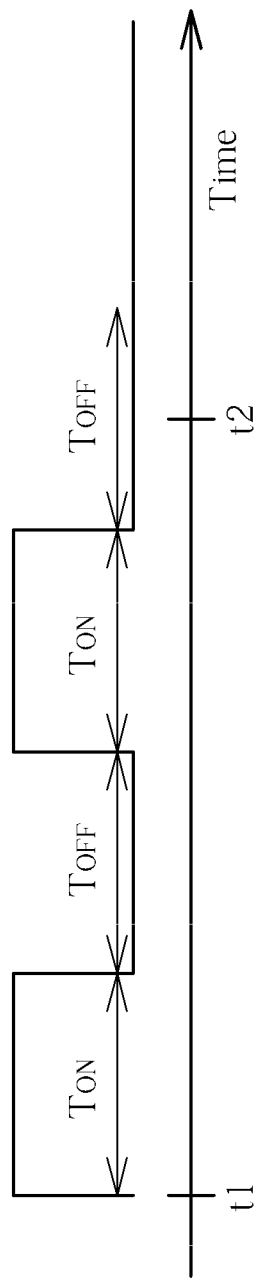
FIG. 6B is a schematic diagram of a control circuit controlling a power supply device shown in FIG. 5 according to an embodiment of the present invention.

According to the control process 60, when the determining unit 508 determines that a keypad of the keyboard 500 is pressed, the switching unit 510 controls the power supply device 504 to intermittently output power. That is, the switching unit 510 controls the power supply device 504 to output power for the duration $T_{ON}$ and stop outputting power for the duration $T_{OFF}$. Thus, the time the power supply device 504 outputs power can be reduced, to reduce power consumption. For example, please refer to FIG. 6B, which is a schematic diagram of how the control circuit 506 controls operations of the power supply device 504. In FIG. 6B, a high level squarewave is utilized for triggering the power supply device 504 to output power. If at a time point t1, the determining unit 508 determines that a keypad of the keyboard 500 is pressed, then the switching unit 510 controls the power supply device 504 to output power for the duration $T_{ON}$ starting from the time point t1, stop outputting power for the duration $T_{OFF}$ after the duration $T_{ON}$, and repeat this order until there is no keypad being pressed at a time point t2. In other words, during the process that the user manipulates the operation interface 50 (from t1 to t2), the power supply device 504 operates for two duration $T_{ON}$, and does not need continuous operation, so as to reduce power consumption.

In the prior art, the light guide film only has function of light transmission, such that when the user uses the portable electronic device, the backlight module of the keyboard must be powered to display corresponding characters, causing power consumption. In comparison, using the phosphor material, the present invention allows the backlight module to keep bright for a while right after the power supply device is turned off, so as to save power by switching the power supply device on/off.

To sum up, the present invention fills the hole of the light guide film with the phosphor material, so that the backlight module can keep bright for a while right after the light emitting unit is tuned off. Consequently, power consumption can be reduced by switching the light emitting unit on/off.

Those skilled in the art will readily observe that numerous modifications and alterations of the device and method may be made while retaining the teachings of the invention.

What is claimed is:

1. A backlight module for an operation interface of a portable electronic device, the operation interface comprising at least one keypad, the backlight module comprising:
   a light guide film, comprising at least one through hole corresponding to the at least one keypad, and filled with a phosphor material into the through hole;
   a backlight board, installed at a bottom of the light guide film, for reflecting light; and
   a light emitting unit, installed on a side of the light guide film, for receiving an intermittent power source to generate a light source to an inside of the light guide film;
   wherein the phosphor material comprises a first surface and a second surface, and according to the phosphor material being liquid with cooled-down and surface-tension dried formation or being powdery with hot pressing formation, the first surface is close to the backlight board and forms a concave down curve by viewing from the backlight board to the light guide film, and the second surface is away from the backlight board and forms a concave up curve by viewing from the backlight board to the light guide film.

2. The backlight module of claim 1, wherein a volume of the phosphor material after dry is smaller than a volume of the phosphor material before dry.

3. The backlight module of claim 2, wherein the phosphor material forms a double concave structure in the at least one through hole.

4. The backlight module of claim 1, wherein the phosphor material is filled in the at least one through hole by hot pressing.

5. The backlight module of claim 4, wherein the phosphor material forms a double concave structure in the at least one through hole.

6. A method of manufacturing a backlight module comprising:
   forming a light guide film;
   forming at least one through hole at a position corresponding to at least one keypad of an operation interface in the light guide film;
   filling the at least one through hole with a phosphor material;
   forming a backlight board at a bottom of the light guide film; and
   forming a light emitting unit on a side of the light guide film to receive an intermittent power source;
   wherein the phosphor material comprises a first surface and a second surface, and according to the phosphor material being liquid with cooled-down and surface-tension dried formation or being powdery with hot pressing formation, the first surface is close to the backlight board and forms a concave down curve by viewing from the backlight board to the light guide film, and the second surface is away from the backlight board and forms a concave up curve by viewing from the backlight board to the light guide film.

7. The method of claim 6, wherein a volume of the phosphor material after dry is smaller than a volume of the phosphor material before dry.

8. The method of claim 6, wherein the phosphor material is filled in the at least one through hole by hot pressing.

9. The method of claim 6 further comprising forming a double concave structure in the phosphor material of the at least one through hole.

10. An operation interface for a portable electronic device comprising:
    at least one keypad;
    a backlight module comprising:
      a light guide film, comprising at least one through hole corresponding to the at least one keypad, and filled with a phosphor material;
      a backlight board, installed at a bottom of the light guide film, for reflecting light; and
      a light emitting unit, installed on a side of the light guide film, for generating a light source to an inside of the light guide film;
    a power supply device, for providing an intermittent power source to the light emitting unit; and
    a control circuit, for controlling the power supply device according to a pressing condition of the at least one keypad;
    wherein the phosphor material comprises a first surface and a second surface, and according to the phosphor material being liquid with cooled-down and surface-tension dried formation or being powdery with hot pressing formation, the first surface is close to the backlight board and forms a concave down curve by viewing from the backlight board to the light guide film, and the second surface is away from the backlight board and forms a concave up curve by viewing from the backlight board to the light guide film.

11. The operation interface of claim 10, wherein a volume of the phosphor material after dry is smaller than a volume of the phosphor material before dry.

12. The operation interface of claim 11, wherein the phosphor material forms a double concave structure in the at least one through hole.

13. The operation interface of claim 10, wherein the phosphor material is filled in the at least one through hole by hot pressing.

14. The operation interface of claim 13, wherein the phosphor material forms a double concave structure in the at least one through hole.

15. The operation interface of claim 10, wherein the control circuit comprises:
    a determining unit, for determining the pressing condition of the at least one keypad, to generate a determination result; and
    a switching unit, for controlling the power supply device to intermittently output the power source to the light emitting unit while the determination result indicates that the at least one keypad is pressed.

* * * * *